(12) United States Patent
van den HOEK et al.

(10) Patent No.: US 11,822,980 B2
(45) Date of Patent: Nov. 21, 2023

(54) INTEGRATION COMPONENT ASSESSMENT

(71) Applicant: SAP SE, Walldorf (DE)

(72) Inventors: Alex van den HOEK, Amersfoort (NL); Florian Okos, Hannover (DE); Matthias Allgaier, Ittlingen (DE)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 17/694,212

(22) Filed: Mar. 14, 2022

(65) Prior Publication Data

US 2023/0289245 A1 Sep. 14, 2023

(51) Int. Cl.
*G06F 9/54* (2006.01)
*G06Q 10/0639* (2023.01)

(52) U.S. Cl.
CPC ....... *G06F 9/546* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 2011/0208788 A1* | 8/2011 | Heller | G06F 8/10 707/810 |
| 2016/0232042 A1* | 8/2016 | Ritter | G06F 8/427 |
| 2016/0359690 A1* | 12/2016 | Gravenites | G06F 3/04842 |

* cited by examiner

*Primary Examiner* — Charles E Anya
(74) *Attorney, Agent, or Firm* — Buckley, Maschoff & Talwalkar LLC

(57) ABSTRACT

Systems and methods include determination of an integration style of a first interface between two or more applications, determination of a first message flow of the first interface, the first message flow between two of the two or more applications and associated with an integration domain and the integration style, determination of a first one or more key characteristic values associated with the first message flow, determination of a plurality of integration components associated with the integration domain and the integration style, each of the determined plurality of integration components associated with fulfillment data of each of a plurality of key characteristic values, determination, for each of the plurality of integration components, of an integration score based on fulfillment data associated with the integration component for the first one or more key characteristic values, and determination of one or more of the plurality of integration components to implement the first message flow based on the determined integration scores.

24 Claims, 9 Drawing Sheets

| Integration Component | Styles | Key Characteristics | Key Characteristic Value, Fulfillment | Integration Policies (D/S/[App], Rating) |
|---|---|---|---|---|
| | | | | |
| | | | | |

FIG. 4

INTEGRATION COMPONENT ASSESSMENT

BACKGROUND

Conventional distributed computing systems receive an incoming request, route the request to one or more appropriate applications deployed within a system landscape, and return of a response. Modern system landscapes consist of applications provided by several geographically-distant computing systems which may be operated by different vendors, and which may execute on different platforms. For example, applications may be deployed within on-premise data centers (which themselves may be located in disparate geographic locations) and within data centers provided by one or more infrastructure as-a-service (i.e., cloud) providers.

Integration of disparate applications (which, for purposes of the present description, also include services) has long posed a challenge for IT personnel. Integration is becoming an increasingly prevalent activity as more and more applications are migrated to the cloud, more applications become publicly available, and demand increases for integration of add-on services such as IoT, blockchain, and machine learning. Moreover, the complexity of integration has increased exponentially, due in part to the increasing complexity of landscapes and the emergence of new integration patterns.

Such complexity may lead to inefficiencies and undesirable outcomes. Integration includes, among other aspects, the selection and deployment of integration components which facilitate the integration of applications. For example, an integration component may provide functionality required for process integration and data integration between the two applications. Current techniques for manually selecting appropriate integration components may be time-consuming and error-prone, and may lead to ineffective or inefficient integrations. Systems are desired to efficiently determine the needs of an integration and one or more suitable integration components for satisfying those needs.

BRIEF DESCRIPTION OF THE DRAWINGS

FIG. 4 is a tabular representation of metadata associated with integration components and used to assess components for integrating applications according to some embodiments.

DETAILED DESCRIPTION

Figure 1:
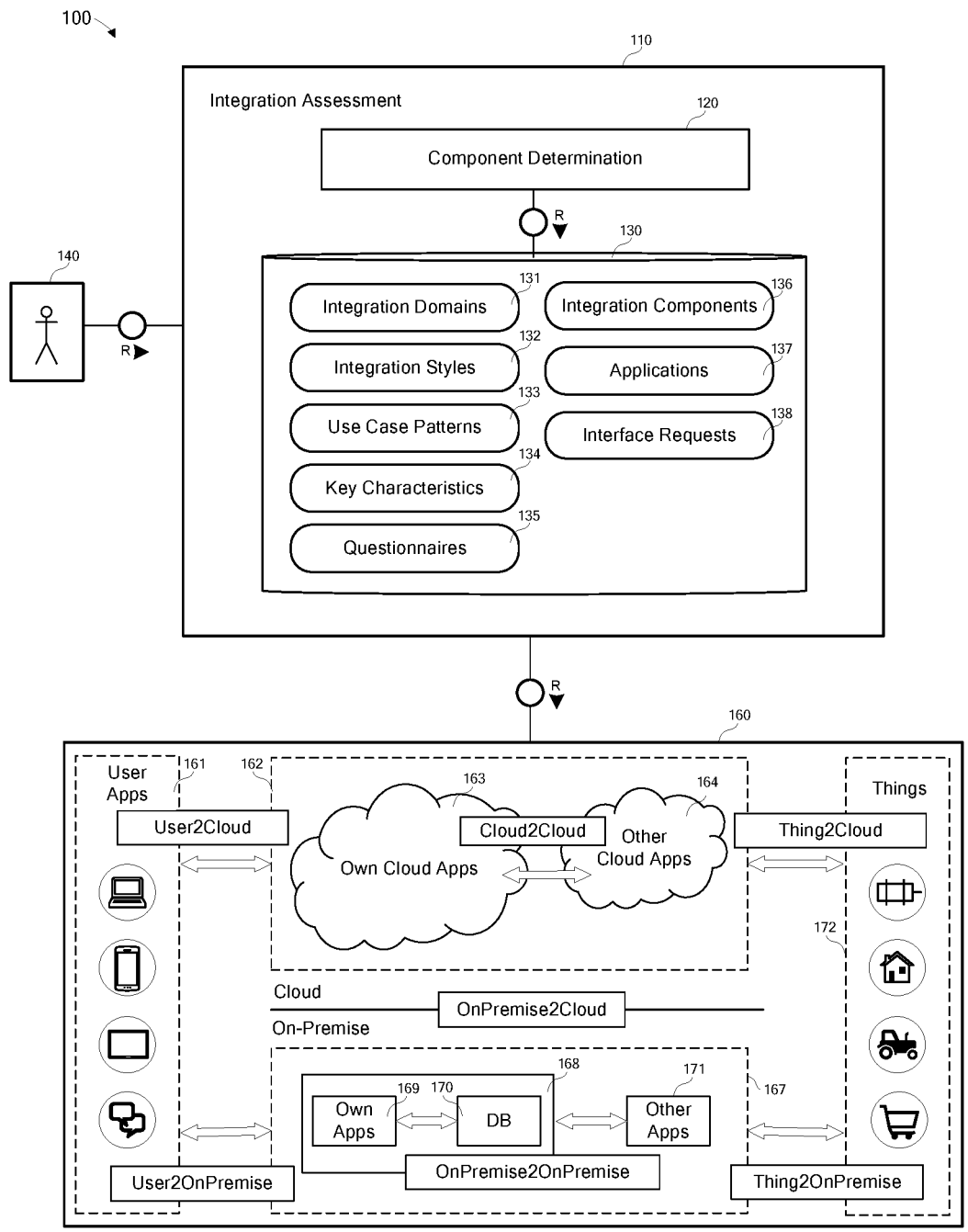
FIG. 1 is a block diagram of an architecture to assess components for integrating applications within a system landscape according to some embodiments.

The following description is provided to enable any person in the art to make and use the described embodiments. Various modifications, however, will be readily-apparent to those in the art.

Some embodiments facilitate the determination of integration components which satisfy a given integration interface request. An integration interface request is generated in order to request integration components for facilitating the integration of applications (e.g., 1:1, 1:n, n:1, n:n) such that the applications may be used together. An integration interface request is associated with an integration style (e.g., process integration, data integration, user integration), and a use case pattern (e.g., A2A integration, data replication, UI integration). An integration interface request includes one or more message flows, each of which is associated with the style and the use case pattern of its integration interface request. However, each of the one or more message flows may be associated with a same or different integration domain (e.g., on-premise to cloud, cloud to cloud, thing to on-premise). In one example, a 1:n integration interface request is generated to integrate an on-premise Enterprise Resource Planning system with an on-premise data management and analytics application and with a cloud-based business-to-business (B2B) communication application. Such an integration interface request includes two message flows, one associated with an OnPremise2OnPremise domain and one associated with the OnPremise2Cloud domain.

According to some embodiments, a user having technical knowledge of integration concepts is provided with a set of inquiries (e.g., a questionnaire) for each message flow of a generated integration interface request. More particularly, the set of inquiries may be determined based on the integration style of the integration interface request. The set of inquiries relate to a plurality of key characteristics and are intended to solicit from the user one or more key characteristic values for each key characteristic. Protocol Adapter Support is one example of a key characteristic, having associated key characteristic values SFTP, SOAP and REST, for example. Some key characteristics are associated with key characteristic values of Yes, No (or True, False). For example, the key characteristic Message Mapping may either be required by an integration interface request or not required by an integration interface request. Other examples of key characteristics include Protocol Conversion, Data Structure Type Support or Predefined Integration Content, but embodiments are not limited thereto.

Embodiments assume the existence of a set of integration components. Each integration component comprises code which provides particular functionality when executed. The functionality of each integration component is characterized by one or more key characteristic values which are associated with the integration component. For each key characteristic value with which an integration component is associated, the integration component is also associated with fulfillment data which indicates a degree to which the integration component fulfills (i.e., supports) the key characteristic value. In the case of the Protocol Adapter Support key characteristic, an integration component may be associated with fulfillment data 5, 10 and 2 for respective key characteristic values SFTP, SOAP and REST, for example.

Using the fulfillment data of each available integration component and the key characteristic values specified by the integration architect, embodiments may determine one or more integration components for the integration interface request. Embodiments may also provide for selective deployment of the determined integration components into a system landscape.

FIG. 1 is a block diagram of architecture 100 according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Integration assessment 110 may comprise any combination of computing hardware and software suitable to provide component determination 120 and to persist the data of storage 130. Component determination 120 may comprise program code conforming to any suitable programming language(s) and executable to cause computing hardware to perform the functions described herein. Storage 130 may comprise any one or more systems for storing data that are or become known, including distributed data storage systems. The depicted data of storage 130 need not be stored by a same storage system or co-located.

Component determination 120 uses the data of storage 130 to identify integration components for use in integrating one or more applications of system landscape 160. The data of storage 130 comprises integration domains 131, integration styles 132, use case patterns 133, key characteristics 134, questionnaires 135 and integration components 136.

Each of integration domains 131 specifies the respective domains of applications to be integrated. For example, system landscape 160, to which embodiments are not limited, includes various domains in which applications may be deployed. The domains include user applications domain 161, cloud domain 162, on-premise domain 167 and things (i.e., IoT) domain 172.

The domains of landscape 160 define the integration domains which exist therein. The User2Cloud integration domain is associated with integrations between applications deployed within user applications domain 161 and applications deployed within cloud domain 162. As shown, applications deployed within cloud domain 162 may include applications deployed within cloud 163 (e.g., managed by the vendor of integration assessment 110) and other clouds 164. In this regard, the Cloud2Cloud integration domain is associated with integrations between applications deployed within cloud 163 and applications deployed within cloud 164.

On-premise domain 167 of landscape 160 may include enterprise system 168 consisting of applications 169 and database system 170, as well as other applications 171. The OnPremise2OnPremise integration domain is associated with integrations between applications deployed within on-premise domain 167. The User2OnPremise integration domain, on the other hand, is associated with integrations between applications deployed within user applications domain 161 and applications deployed within on-premise domain 167. Moreover, the OnPremise2Cloud integration domain is associated with integrations between applications deployed within on-premise domain 167 and applications deployed within cloud domain 162.

Things domain 172 includes applications deployed on an IoT platform. These applications may be integrated with cloud applications via a Thing2Cloud integration domain. Similarly, applications deployed in things domain 172 may be integrated with on-premise applications deployed in on-premise domain 167 via a Thing2OnPremise integration domain. Embodiments are not limited to the integration domains depicted in FIG. 1.

Figure 2:
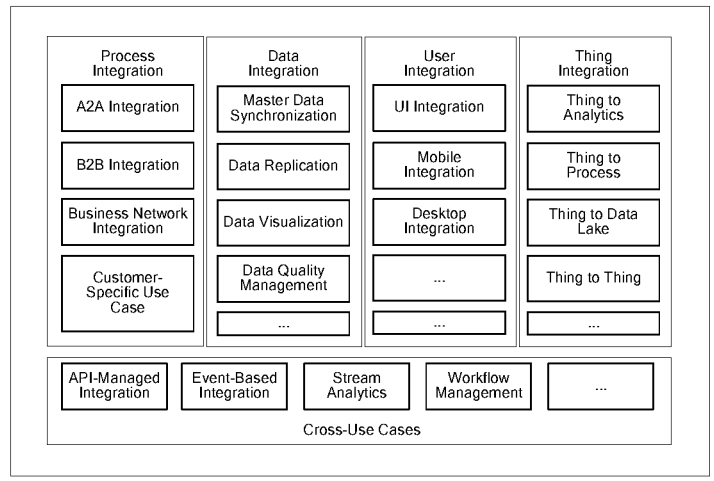
FIG. 2 is a diagram of mappings between integration styles and use case patterns according to some embodiments.

Integration styles 132 and use case patterns 133 are defined to provide additional categorization of a particular integration interface request. FIG. 2 illustrates logical relationships between integration styles of integration styles 132 and use case patterns of use case patterns 133 according to some embodiments. Integration styles 132 and use case patterns 133 are not limited to the example of FIG. 2.

The integration styles of FIG. 2 include process integration, data integration, user integration, thing integration and cross-use cases. Each integration style is associated with several use case patterns, as illustrated by boxes bounding each integration style.

The taxonomy of domain/styles/use case patterns/key characteristics/key characteristic values described herein is believed to be an inventive improvement over the art. One advantage of such a taxonomy is its ability to comprehensively define the requirements of an integration interface request as well as the capabilities of an integration component, thereby allowing, by virtue of the processes described herein, efficient determination of suitable integration components.

Figure 3:
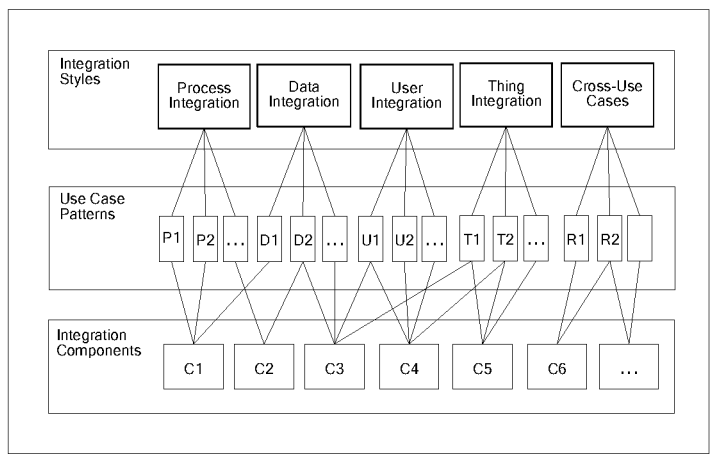
FIG. 3 is a diagram of mappings between integration styles, use case patterns and integration components according to some embodiments.

FIG. 3 illustrates relationships between integration styles, use case patterns and integration components according to some embodiments. For consistency, the integration styles of FIG. 3 are those which are depicted in FIG. 2. Also consistent with FIG. 2, and depicted by a connecting line therebetween, each integration style is associated with a distinct set of use case patterns. That is, each use case pattern is associated with only one integration style.

Integration components C1-C6 are defined in integration components 136. Each of integration components C1-C6 is associated with one or more of the use case patterns. It is noted that the use case patterns with which a particular integration component is associated may be associated with different integration styles. For example, integration component C1 is associated with use case patterns P1 and P2 of the process integration integration style and with use case pattern D1 of the data integration integration style.

FIG. 4 is a tabular representation of a portion of integration components 136 according to some embodiments. As shown, integration components 136 associates each of a plurality of integration components with various metadata. FIG. 4 is intended to illustrate logical relationships between metadata and code (i.e., the integration components) and not to limit the manner in which such logical relationships may be represented in data or storage.

Each integration component is associated with one or more styles. The styles with which an integration component is associated may be specified by a developer of the integration component. In some embodiments, the styles associated with an integration component may be changed by a user (e.g., an integration architect).

As illustrated in FIG. 3, more than one integration component may be associated with a particular style. An integration component may be associated with different styles which are in turn associated with different domains.

Although the present description describes associations between integration components and styles, in some embodiments each integration component may be also or alternatively associated with a use case pattern.

Each integration component is also associated with one or more key characteristics. The key characteristics associated with a particular integration component may be specified by a developer of the integration component and edited thereafter by a user. For each associated key characteristic, an integration component is also associated with one or more key characteristic values.

As illustrated in FIG. 4, each key characteristic value associated with an integration component is also associated with fulfillment data. Accordingly, for a given integration component, a number of (key characteristic value, fulfillment data) tuples may be defined. As described above, the key characteristic value of a tuple may be a Boolean value, with the corresponding fulfillment data indicating the degree to which the integration component fulfills the Boolean value for the key characteristic value. For example, the key characteristic Message Mapping may be associated with the single value True, and a given integration component may be associated with the single tuple (True, 3) for the key characteristic Message Mapping.

Each integration component may be associated with one or more integration policies. An integration policy defines a suitability of an integration component for a given domain and style. In some cases, an integration policy may define a suitability of an integration component for a given domain, style (and/or use case pattern) and application (i.e., source or target application of an integration). According to some embodiments, possible suitabilities include General Recommendation, Reasonable Alternative, Possible Exception and To Be Avoided. Integration policies may be used as described below to determine an order in which integration components are considered for satisfaction of a given integration interface request.

Figure 5:
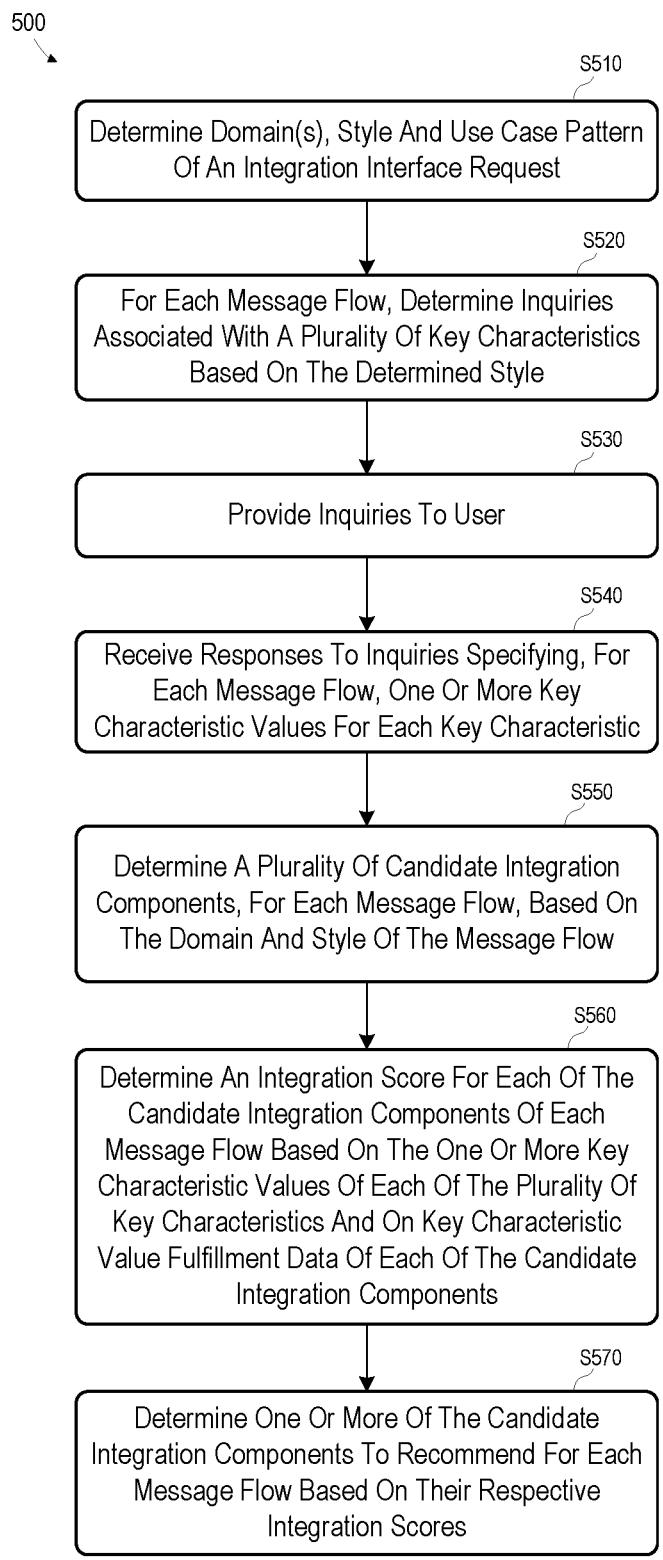
FIG. 5 comprises a flow diagram of a process to assess components for integrating applications within a system landscape integration according to some embodiments.

FIG. 5 comprises a flow diagram of process 500 according to some embodiments. Process 500 may be performed by component determination 120 of integration assessment 110 but embodiments are not limited thereto. Process 500 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 500 begins at S510, at which the domain, style and use case pattern of an integration interface request are determined. The domain, style and use case pattern may be determined from a received integration interface request. The request may be submitted by an integration architect via a user interface provided by integration assessment 110. In this regard, integration architect 140 may execute a web browser to access a URL of integration assessment 110 and receive a web page or web pages in return which allows integration architect 130 to define an integration interface request.

The definition of the integration interface request may include, among other potential information, one or more domains (e.g., OnPremise2Cloud), a style (e.g., process integration), and a use case pattern (e.g., A2A integration). The request need not directly specify the domain(s) in some embodiments. In one example, the request specifies a source application, a target application, a style and a use case pattern. Component determination 120 may access applications 137 of storage 140 to determine the deployment locations of the specified applications in order to determine the domain(s) of the integration interface request.

Next, at S520, inquiries associated with a plurality of key characteristics are determined. The inquiries may be determined based on the style and/or the use case pattern determined at S510. In one example, each questionnaire 135 is associated with a respective style. S520 may therefore include determination of one of questionnaires 135 which is associated with the style determined at S510. As described above, the questionnaire includes inquiries which ask the user to specify the key characteristic values which are required by the interface integration request. As described above, an integration interface request may include one or more message flows. In some embodiments, a set of inquiries (e.g., a questionnaire) is determined at S520 for each message flow. Since the styles of each message flow of an integration interface request are identical, the questionnaires determined for each message flow at S520 may be identical as well.

The inquiries are provided to the user (e.g., in the form of a Web page questionnaire) at S530 and responses to the inquiries are received at S540. The responses specify, for each message flow, one or more key characteristic values for each of one or more key characteristics. A plurality of candidate integration components are determined at S550 for each message flow based on the responses to the inquiries and the domain and style determined at S510.

As described above, each of integration components 136 may be associated with metadata that specifies one or more styles. S550 may therefore include identification of those integration components 136 which are associated with the determined style. In a case that each of integration components 136 is also or alternatively associated with metadata that specifies one or more use case patterns, S550 may include identification of those integration components 136 which are associated with the determined style and/or use case pattern). As will be described below, S550 may also include filtering and/or ordering of the thusly-identified candidate integration components for a message flow based on their respective integration policies. Evaluation of these integration policies may take into account one or more of the determined domain of the message flow, the style (and/or use case pattern) of the integration interface request, and the applications specified in the interface integration request.

Each of the plurality of candidate integration components is associated with one or more key characteristic values and fulfillment data associated with each of the one or more key characteristic values. An integration score is determined for each of the candidate integration components determined at S560 based on these (key characteristic values, fulfillment data tuples). The integration score indicates a degree to which an integration component satisfies the key characteristic values specified in the responses to the inquiries for a particular message flow. Generally, S560 may include determining, for each integration component, key characteristic values which are associated with the integration component and also specified in the responses to the inquiries and, for each determined key characteristic value of the integration component, identifying fulfillment data associated with the key characteristic value. An integration score for the integration component is then determined based on the identified fulfillment data. A process for determining an integration score at S560 according to some embodiments will be described below with respect to FIG. 7.

According to some embodiments, key characteristics may be associated with key characteristic groups. For each message flow, an integration score for each key characteristic group may also be determined at S560 based on the integration scores of the key characteristics which are associated with the key characteristic group.

At S570, and for each message flow, one or more of the candidate integration components are determined to recommend based on their respective integration scores. The determination of the one or more of the candidate integration components for a message flow may be independent of the determination of the one or more of the candidate integration components for another message flow, or the combined requirements of both message flows may be considered to determine a single set of one or more candidate integration components. The determined one or more integration components may be presented to an integration architect as a response to a received integration interface request.

Figure 6:
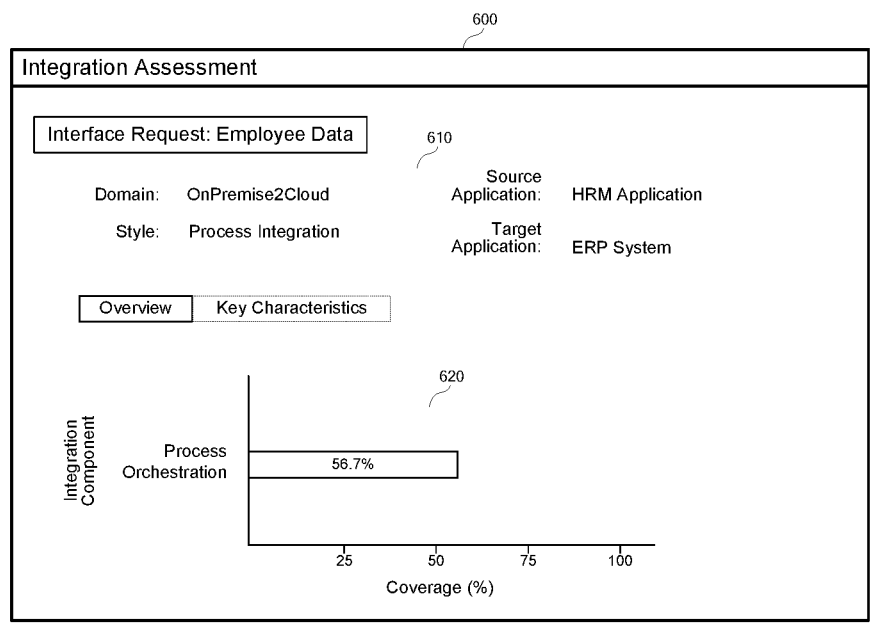
FIG. 6 is view of a user interface to present component recommendations for integrating applications according to some embodiments.

FIG. 6 is a view of user interface 600 to present a determined integration component for a message flow of an integration interface request according to some embodiments. User interface 600 may be presented as a Web page, and includes areas 610 and 620. Area 610 presents data associated with the message flow, including the domain, style, source application and target application. Area 620 presents an integration score (e.g., coverage %) for each recommended integration component. Area 620 may also present, for each recommended integration component, fulfillment scores for each key characteristic determined for the message flow. Fulfillment scores may be used to determine an integration score and will be described below. Embodiments are not limited to the visual appearance or content of user interface 600.

As noted, S570 may include determination of more than one integration component for a message flow. Process 800 of FIG. 8 describes some embodiments for determining more than one candidate integration component to recommend for a given message flow of an integration interface request. Such a determination may be based on an ordered list of candidate integration components. Generation of such an ordered list according to some embodiments is described with respect to process 900 of FIG. 9.

Figure 7:
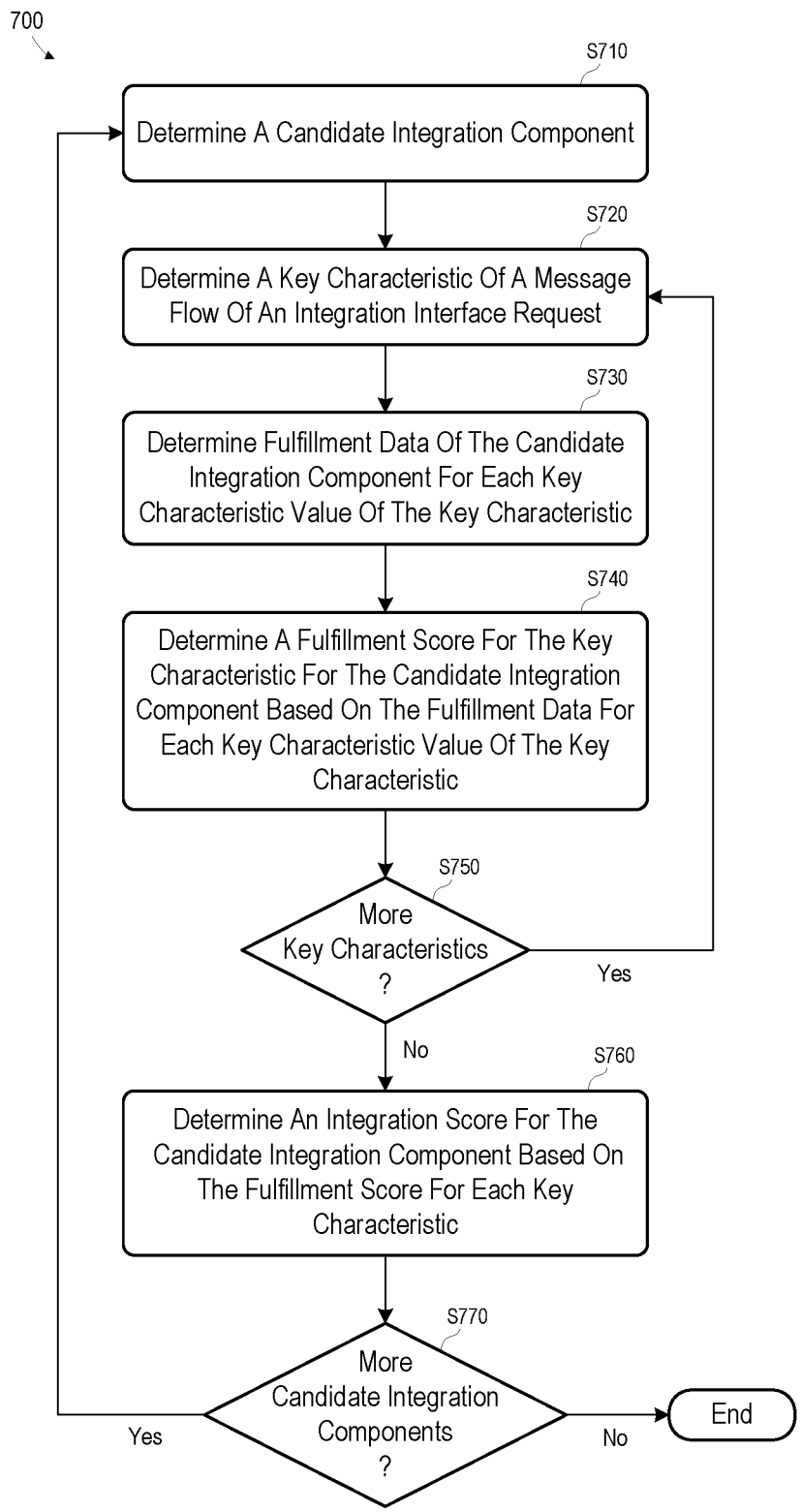
FIG. 7 comprises a flow diagram of a process to determine integration scores for integration components according to some embodiments.

FIG. 7 comprises a flow diagram of process 700 to determine integration scores for candidate integration components for each message flow of an interface integration request according to some embodiments. Process 700 may therefore comprise an implementation of S560 of process 500.

Initially, at S710, a candidate integration component is determined. As described above, the candidate integration component may comprise one of a list of candidate integration components determined based on a domain and style (and/or use case pattern) of an integration interface request. The list of candidate integration components may be determined from integration components 136 based on metadata associating each of integration components 136 with a style (and/or use case pattern) and, as will be described below with respect to FIG. 9, based on applicable integration policies.

At S720, a key characteristic of a message flow of an integration interface request is determined. Each integration interface request is associated with a style (and/or use case pattern) which in turn is associated with a questionnaire for soliciting key characteristic values of a plurality of key characteristics. Accordingly, the key characteristic determined at S720 is one of the key characteristics of the currently-active integration interface request. For example, the key characteristic Protocol Adapter Support may be determined at S720.

Fulfillment data of the candidate integration component is determined for each key characteristic value of the determined key characteristic. Continuing with the example of the key characteristic Protocol Adapter Support, it may be assumed that the determined candidate integration component is associated with (by means of metadata of integration components 136) fulfillment data of 5 for key characteristic value SFTP, fulfillment data of 10 for key characteristic value SOAP, and fulfillment data of 2 for the key characteristic value REST. In other words, the above-described tuples associated with the determined candidate integration component in integration components 136 are (SFTP, 5), (SOAP, 10), and (REST, 2).

Next, at S740, a fulfillment score is determined for the key characteristic based on the fulfillment data for each key characteristic value determined at S730. Any suitable method may be used to determine the fulfillment score at S740. In some embodiments, the fulfillment score for a key characteristic k is calculated as:

$$f(r_k) = \frac{1}{n}\sum_{i=1}^{n} r_n$$

where n is the number of key characteristic values of the key characteristic and $r_n$ represents the fulfillment data of key characteristic value n. Applying this calculation to the above fulfillment data:

$$f(r_{PAS}) = \frac{1}{3}(5 + 10 + 2) = 5.67.$$

At S750, it is determined whether the fulfilment scores of any other key characteristics of the current message flow remain to be determined. If so, flow returns to S720 and continues as described above to determine the fulfillment score of the current candidate integration component for a next key characteristic of the message flow. Flow continues in this manner until it is determined at S750 that fulfillment scores have been determined for the candidate integration component for all key characteristics of the message flow, at which point flow proceeds to S760.

An integration score is determined for the candidate integration component at S760 based on all the fulfillment scores determined for the candidate integration component at the various preceding iterations of S740. Any suitable calculation including a sum, an average, or other combination of the fulfillment scores may be used for the determination at S760. According to some embodiments, the integration score for a candidate integration component is determined at S760 as the weighted sum of the fulfillment scores determined for the candidate integration component:

$$f(r_t) = \frac{1}{\sum_{k=1}^{k} w_k} \sum_{i=1}^{k} r_k * w_k$$

where $w_k$ represents the weight of key characteristic k.

By way of example, it is assumed that the fulfillment score for key characteristic Protocol Adapter Support is 5.67 and its weight w is 2, the fulfillment score for key characteristic Value Mapping is 10 and its weight w is 0.5, and the fulfillment score for key characteristic API Security is 3 and its weight w is 1.5. Using the above calculation:

$$f(r_t) = \frac{1}{2 + 0.5 + 1.5} * (5.67 * 2 + 10 * 0.5 + 3 * 1.5) = \frac{1}{4} * (11.34 + 5 + 4.5) = 5.21$$

Assuming a maximum fulfillment score of 10, this integration score may be recorded as 5.21/10=52.1%.

At S770, it is determined whether integration scores have been determined for all of the determined candidate integration components. If not, flow returns to S710 to determine a next candidate integration component for which to determine an integration score. The next candidate integration component may comprise a next component of a list of candidate integration components. Flow then proceeds as described above to determine an integration score for the next candidate integration component. Process 700 terminates for the current message flow once integration scores have been determined for all candidate components. Process 700 is repeated for each message flow of an integration interface request.

Figure 8:
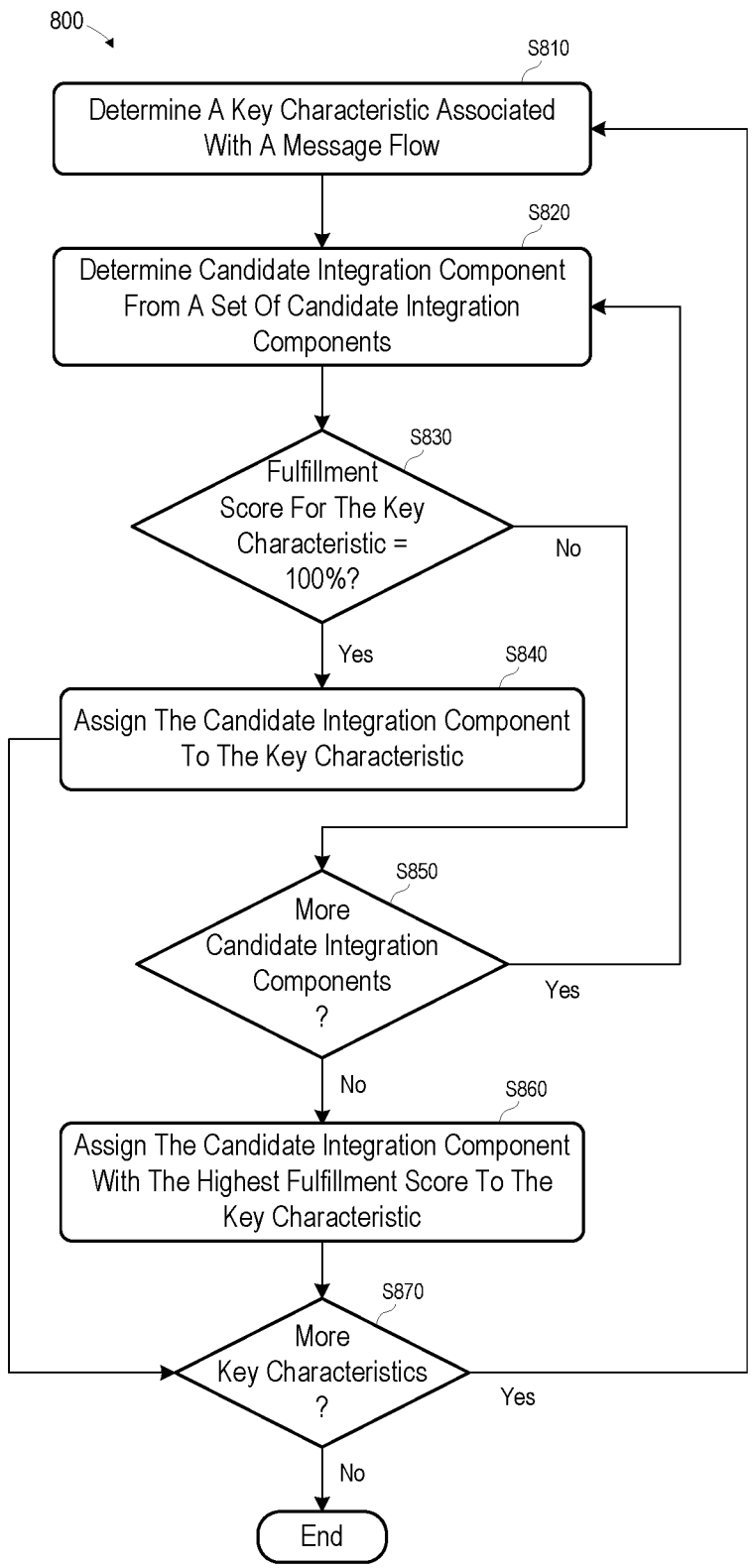
FIG. 8 comprises a flow diagram of a process to determine integration components for integrating applications based on their key characteristic fulfillment scores according to some embodiments.

As described above with respect to S570 of process 500, submission of an integration interface request may result in the recommendation of more than one candidate integration component for each message flow. FIG. 8 comprises a flow diagram of process 800 to determine integration components for a message flow based on their key characteristic fulfillment scores according to some embodiments of S570. Accordingly, prior to process 800, key characteristic fulfillment scores may be determined as described above for each of a plurality of candidate integration components.

A key characteristic associated with a message flow is determined at S810. Next, at S820, a candidate integration component is determined from a set of candidate integration components. The list of candidate integration components may be determined from integration components 136 based on metadata associating each of integration components 136 with a style (and/or use case pattern). The list may be ordered such that the first candidate integration component determined at S820 is associated with a highest rating and subsequently-determined candidate integration components are associated with ratings of decreasing magnitude. Ordering of such a list is discussed below with respect to process 900 of FIG. 9.

At S830, it is determined whether a fulfillment score of the determined candidate integration component for the key characteristic is 100% (i.e., the candidate integration component fully satisfies all key characteristic values of the key characteristic). If so, the candidate integration component is assigned to the key characteristic at S840 and flow continues to S870 to determine whether any other of the key characteristics determined at S810 remain to be considered by process 800. If so, flow returns to S810 to select another key characteristic of the current message flow.

Flow continues to S850 from S830 if it is determined at S830 that the fulfillment score of the determined candidate integration component for the key characteristic is not 100%. At S850 it is determined whether any candidate integration components remain to be considered with respect to the current key characteristic. If so, flow returns to S820 to select another candidate integration component from the (possibly ordered) list of candidate integration components.

If the determination at S850 is negative, then none of the candidate integration components is associated with a fulfillment score of 100% with respect to the current key characteristic. Accordingly, at S860, the candidate integration component with the highest fulfillment score with respect to the current key characteristic is assigned to the current key characteristic.

Process 800 continues in the above manner until it is determined at S870 that all of the key characteristics determined at S810 were assigned to an integration component by process 800. At this point, each key characteristic has been assigned to a candidate integration component associated with a fulfillment score of 100% with respect to the current key characteristic or to a candidate integration component associated with a highest fulfillment score of all of the candidate integration components.

Figure 9:
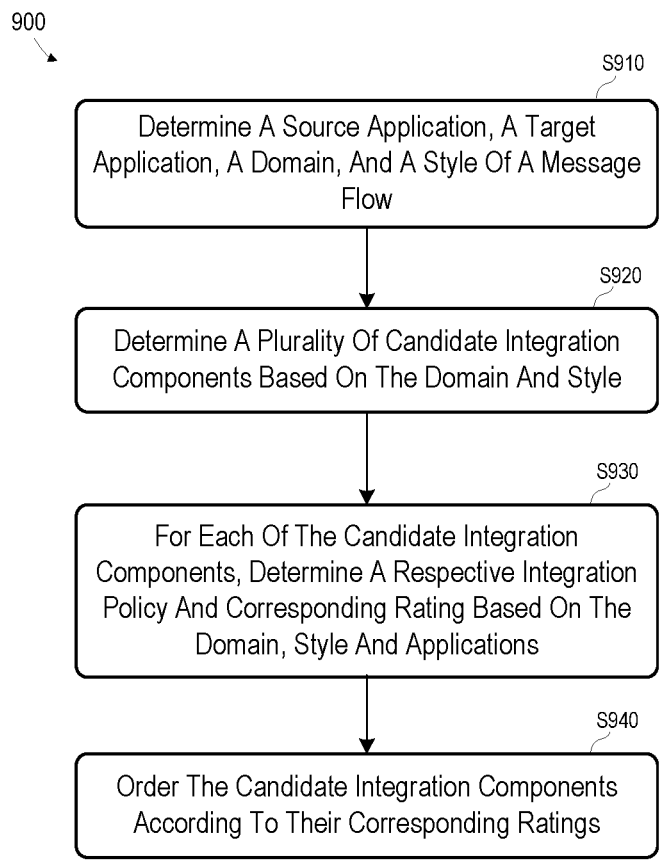
FIG. 9 comprises a flow diagram of a process to determine and order candidate integration components based on integration policies according to some embodiments.

FIG. 9 comprises a flow diagram of process 900 to determine and order candidate integration components based on integration policies according to some embodiments. Accordingly, process 900 may occur prior to process 800 in order to provide a set of candidate integration components from which a candidate integration component is determined at S820. In some embodiments, process 900 comprises an implementation of S550 of process 500.

Initially, at S910, various entities associated with an integration interface request are determined. The entities may be specified in an integration request as described above and may include a source application, a target application, a domain, and a style. As described above with respect to S550, a plurality of candidate integration components may be determined at S920 based on the domain and the style.

For each of the candidate integration components, a respective integration policy and a corresponding rating are determined at S930. The integration policy and rating for a candidate integration component are determined based on the determined source application, target application, domain, and style.

As described above, a candidate integration component may be associated with one or more integration policies. The integration policies for a given candidate integration component are ordered by priority. For example, an integration policy which associated with a domain, a style and an application may be assigned a higher priority that an integration policy which is associated with a domain and a style only. Accordingly, S930 may comprise determining all integration policies for each candidate integration component, determining candidate integration policies of each candidate component which correspond to the determined domain, style and applications, and determining a highest-priority candidate integration policy for each candidate integration component.

Each integration policy is associated with a rating. In some embodiments, the ratings, in order of priority from highest to lowest, are General Recommendation, Reasonable Alternative, Possible Exception and To Be Avoided. S930 also comprises determining the rating corresponding to each of the highest-priority candidate integration policies determined for each candidate integration component.

The candidate integration components are ordered according to the ratings corresponding to their determined integration policies. For example, a candidate integration component whose determined integration policy has a rating General Recommendation is ordered higher than a candidate integration component whose determined integration policy has a rating Reasonable Alternative.

The order of candidate integration components may become relevant during execution of process 800. For example, if candidate integration components are considered at S820 according to their order, the highest-ordered candidate integration component having a fulfillment score of 100% for a particular key characteristic will always be assigned to the key characteristic at S840 regardless of whether other lower-ordered key characteristics also have a fulfillment score of 100% for the particular key characteristic.

Figure 10:
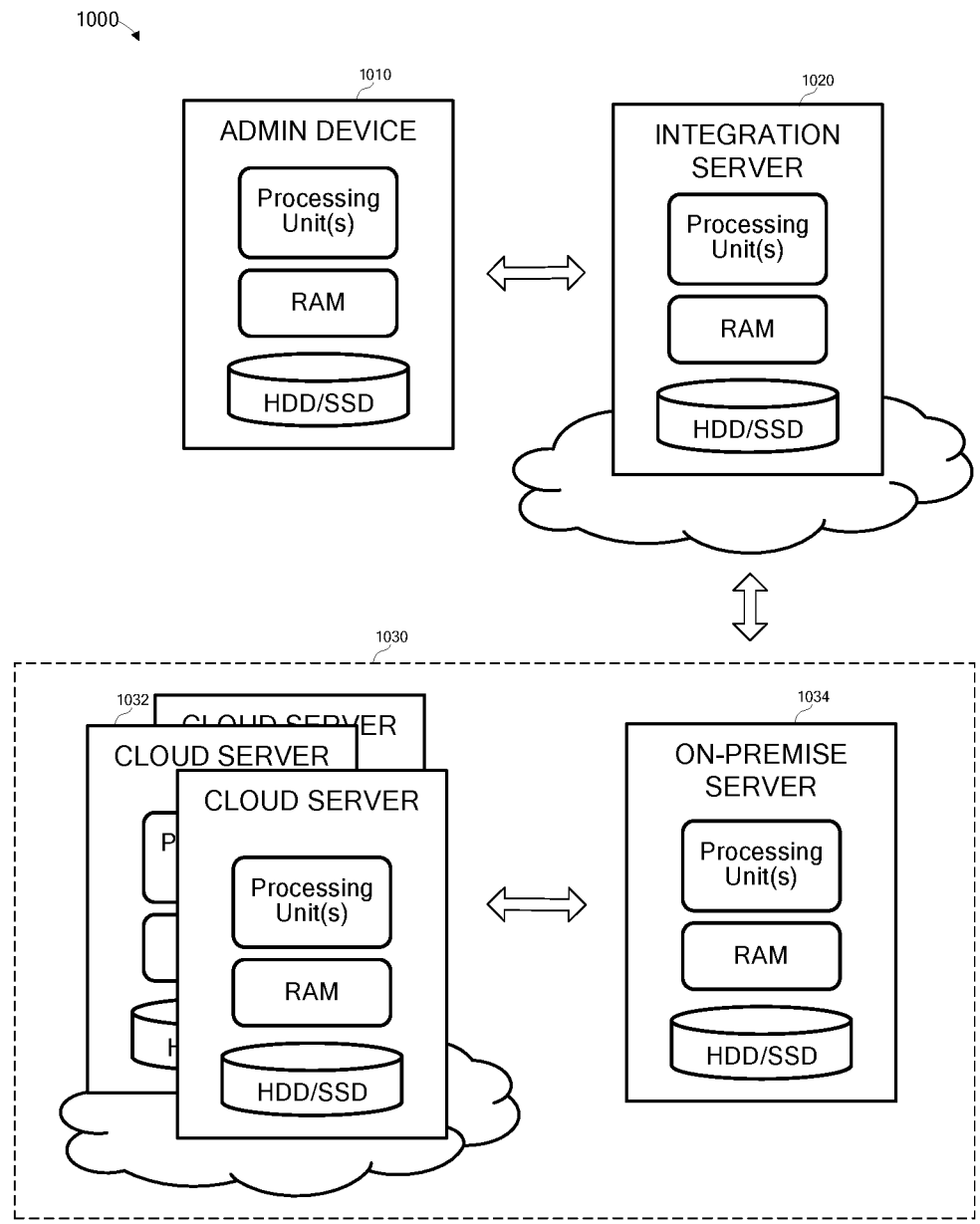
FIG. 10 is a block diagram of a cloud-based system according to some embodiments.

FIG. 10 is a block diagram of system 1000 according to some embodiments. Integration server 1020 may comprise a cloud-based compute resource, as may cloud servers 1032 of system landscape 1030. Integration server 1020 may execute an integration service to provide functionality described herein with respect to integration assessment 110. The functionality may include other functions suitable for performing an integration of applications within landscape 1030.

Landscape 1030 includes cloud-based applications and on-premise applications provided by on-premise server 1034. As described above, administration device 1010 may define one or more integration interface requests associated with integration of two or more applications of landscape 1030. Integration server 1020 may perform processes as described herein to identify one or more candidate integration components for each integration interface request. Moreover, for each integration interface request, the processes quantify the suitability of each candidate integration component to fulfill each key characteristic of the integration interface request. Using administration device 1010, a user may select from the identified candidate integration components and instruct integration server 1020 to deploy the selected integration components to landscape 1030.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A method comprising:
   determining an integration style of a first interface between two or more applications;
   determining a first message flow of the first interface, the first message flow between two of the two or more applications and associated with an integration domain and the integration style;
   determining a first one or more key characteristic values associated with the first message flow;
   determining a plurality of integration components associated with the integration domain and the integration style, each of the determined plurality of integration components associated with fulfillment data of each of a plurality of key characteristic values;
   for each of the plurality of integration components, determining an integration score based on fulfillment data associated with the integration component for the first one or more key characteristic values;
   determining one or more of the plurality of integration components to implement the first message flow based on the determined integration scores;
   determining a second message flow of the first interface, the second message flow between a second two of the two or more applications and associated with a second integration domain and the integration style;
   determining a second one or more key characteristic values associated with the second message flow;
   determining a second plurality of integration components associated with the second integration domain and the integration style, each of the determined second plurality of integration components associated with second fulfillment data of each of a second plurality of key characteristic values;
   for each of the second plurality of integration components, determining a second integration score based on second fulfillment data associated with the integration component of each of the second one or more key characteristic values; and
   determining one or more of the second plurality of integration components to implement the second message flow based on the determined integration scores.

2. A method according to claim 1, wherein determining a first one or more key characteristic values associated with the first message flow comprises:

determining a questionnaire based on the integration style;

transmitting the questionnaire to a user;

in response to transmitting the questionnaire to the user, receiving the first one or more key characteristic values from the user.

3. A method according to claim 2, wherein the first one or more key characteristic values comprise one or more key characteristics values of each of a plurality of key characteristics, and wherein determining an integration score based on fulfillment data associated with an integration component for the first one or more key characteristic values comprises:

for each of the plurality of key characteristics, determining a fulfillment score based on fulfillment data associated with the integration component for each of the one or more key characteristic values of the key characteristic; and determining the integration score based on the determined fulfillment scores.

4. A method according to claim 3, further comprising:

determining a rating for each of the plurality of integration components based on the determined integration domain and the integration style, wherein a rating of a first one of the plurality of integration components is greater than a rating of a second one of the plurality of integration components, and wherein the one or more of the plurality of integration components to implement the first message flow are determined based on the integration scores and the ratings.

5. A method according to claim 1, wherein the first one or more key characteristic values comprise one or more key characteristics values of each of a plurality of key characteristics, and wherein determining an integration score based on fulfillment data associated with an integration component for the first one or more key characteristic values comprises:

for each of the plurality of key characteristics, determining a fulfillment score based on fulfillment data associated with the integration component for each of the one or more key characteristic values of the key characteristic; and determining the integration score based on the determined fulfillment scores.

6. A non-transitory computer-readable medium storing program code executable by one or more processing units to cause a computing system to:

determine an integration style of a first interface between two or more applications;

determine a first message flow of the first interface, the first message flow between two of the two or more applications and associated with an integration domain and the integration style;

determine a first one or more key characteristic values associated with the first message flow;

determine a plurality of integration components associated with the integration domain and the integration style, each of the determined plurality of integration components associated with fulfillment data of each of a plurality of key characteristic values;

for each of the plurality of integration components, determine an integration score based on fulfillment data associated with the integration component for the first one or more key characteristic values;

determine one or more of the plurality of integration components to implement the first message flow based on the determined integration scores;

determine a second message flow of the first interface, the second message flow between a second two of the two or more applications and associated with a second integration domain and the integration style;

determine a second one or more key characteristic values associated with the second message flow;

determine a second plurality of integration components associated with the second integration domain and the integration style, each of the determined second plurality of integration components associated with second fulfillment data of each of a second plurality of key characteristic values;

for each of the second plurality of integration components, determine a second integration score based on second fulfillment data associated with the integration component of each of the second one or more key characteristic values; and determine one or more of the second plurality of integration components to implement the second message flow based on the determined integration scores.

7. A medium according to claim 6, wherein determination of a first one or more key characteristic values associated with the first message flow comprises:

determination of a questionnaire based on the integration style;

transmission of the questionnaire to a user;

in response to transmission of the questionnaire to the user, reception of the first one or more key characteristic values from the user.

8. A medium according to claim 7, wherein the first one or more key characteristic values comprise one or more key characteristics values of each of a plurality of key characteristics, and wherein determination of an integration score based on fulfillment data associated with an integration component for the first one or more key characteristic values comprises:

for each of the plurality of key characteristics, determination of a fulfillment score based on fulfillment data associated with the integration component for each of the one or more key characteristic values of the key characteristic; and determination of the integration score based on the determined fulfillment scores.

9. A medium according to claim 8, the program code executable by one or more processing units to cause a computing system to:

determine a rating for each of the plurality of integration components based on the determined integration domain and the integration style, wherein a rating of a first one of the plurality of integration components is greater than a rating of a second one of the plurality of integration components, and wherein the one or more of the plurality of integration components to implement the first message flow are determined based on the integration scores and the ratings.

10. A medium according to claim 6, wherein the first one or more key characteristic values comprise one or more key characteristics values of each of a plurality of key characteristics, and wherein determination of an integration score based on fulfillment data associated with an integration component for the first one or more key characteristic values comprises:

for each of the plurality of key characteristics, determination of a fulfillment score based on fulfillment data associated with the integration component for each of the one or more key characteristic values of the key characteristic; and determination of the integration score based on the determined fulfillment scores.

11. A system comprising:

one or more processing units; and a memory storing program code executable by the one or more processing units to cause the system to:

determine an integration style of a first interface between two or more applications;

determine a first message flow of the first interface, the first message flow between two of the two or more applications and associated with an integration domain and the integration style;

determine a first one or more key characteristic values associated with the first message flow;

determine a plurality of integration components associated with the integration domain and the integration style, each of the determined plurality of integration components associated with fulfillment data of each of a plurality of key characteristic values;

for each of the plurality of integration components, determine an integration score based on fulfillment data associated with the integration component for the first one or more key characteristic values;

determine one or more of the plurality of integration components to implement the first message flow based on the determined integration scores;

determine a second message flow of the first interface, the second message flow between a second two of the two or more applications and associated with a second integration domain and the integration style;

determine a second one or more key characteristic values associated with the second message flow;

determine a second plurality of integration components associated with the second integration domain and the integration style, each of the determined second plurality of integration components associated with second fulfillment data of each of a second plurality of key characteristic values;

for each of the second plurality of integration components, determine a second integration score based on second fulfillment data associated with the integration component of each of the second one or more key characteristic values; and determine one or more of the second plurality of integration components to implement the second message flow based on the determined integration scores.

12. A system according to claim 11, wherein determination of a first one or more key characteristic values associated with the first message flow comprises:

determination of a questionnaire based on the integration style;

transmission of the questionnaire to a user;

in response to transmission of the questionnaire to the user, reception of the first one or more key characteristic values from the user.

13. A system according to claim 12, wherein the first one or more key characteristic values comprise one or more key characteristics values of each of a plurality of key characteristics, and wherein determination of an integration score based on fulfillment data associated with an integration component for the first one or more key characteristic values comprises:

for each of the plurality of key characteristics, determination of a fulfillment score based on fulfillment data associated with the integration component for each of the one or more key characteristic values of the key characteristic; and determination of the integration score based on the determined fulfillment scores.

14. A system according to claim 13, the program code executable by the one or more processing units to cause the system to:

determine a rating for each of the plurality of integration components based on the determined integration domain and the integration style, wherein a rating of a first one of the plurality of integration components is greater than a rating of a second one of the plurality of integration components, and wherein the one or more of the plurality of integration components to implement the first message flow are determined based on the integration scores and the ratings.

15. A system according to claim 11, wherein the first one or more key characteristic values comprise one or more key characteristics values of each of a plurality of key characteristics, and wherein determination of an integration score based on fulfillment data associated with an integration component for the first one or more key characteristic values comprises:

for each of the plurality of key characteristics, determination of a fulfillment score based on fulfillment data associated with the integration component for each of the one or more key characteristic values of the key characteristic; and determination of the integration score based on the determined fulfillment scores.

16. A method comprising:

determining an integration style of a first interface between two or more applications;

determining a first message flow of the first interface, the first message flow between two of the two or more applications and associated with an integration domain and the integration style;

determining a first one or more key characteristic values associated with the first message flow, the first one or more key characteristic values comprising one or more key characteristics values of each of a plurality of key characteristics;

determining a plurality of integration components associated with the integration domain and the integration style, each of the determined plurality of integration components associated with fulfillment data of each of a plurality of key characteristic values;

for each of the plurality of integration components, determining an integration score by:

for each of the plurality of key characteristics, determining a fulfillment score based on fulfillment data associated with the integration component for each of the one or more key characteristic values of the key characteristic; and determining the integration score based on the determined fulfillment scores; and determining one or more of the plurality of integration components to implement the first message flow based on the determined integration scores.

17. A method according to claim 16, wherein determining a first one or more key characteristic values associated with the first message flow comprises:

determining a questionnaire based on the integration style;

transmitting the questionnaire to a user;

in response to transmitting the questionnaire to the user, receiving the first one or more key characteristic values from the user.

18. A method according to claim 16, further comprising:

determining a rating for each of the plurality of integration components based on the determined integration domain and the integration style, wherein a rating of a first one of the plurality of integration components is greater than a rating of a second one of the plurality of integration components, and wherein the one or more of the plurality of integration components to implement the first message flow are determined based on the integration scores and the ratings.

19. A non-transitory computer-readable medium storing program code executable by one or more processing units to cause a computing system to:

determine an integration style of a first interface between two or more applications;

determine a first message flow of the first interface, the first message flow between two of the two or more applications and associated with an integration domain and the integration style;

determine a first one or more key characteristic values associated with the first message flow, the first one or more key characteristic values comprising one or more key characteristics values of each of a plurality of key characteristics;

determine a plurality of integration components associated with the integration domain and the integration style, each of the determined plurality of integration components associated with fulfillment data of each of a plurality of key characteristic values;

for each of the plurality of integration components, determine an integration score by:

for each of the plurality of key characteristics, determine a fulfillment score based on fulfillment data associated with the integration component for each of the one or more key characteristic values of the key characteristic; and determine the integration score based on the determined fulfillment scores; and determine one or more of the plurality of integration components to implement the first message flow based on the determined integration scores.

20. A medium according to claim 19, wherein determination of a first one or more key characteristic values associated with the first message flow comprises:

determination of a questionnaire based on the integration style;

transmission of the questionnaire to a user;

in response to transmission of the questionnaire to the user, reception of the first one or more key characteristic values from the user.

21. A medium according to claim 19, the program code executable by one or more processing units to cause a computing system to:

determine a rating for each of the plurality of integration components based on the determined integration domain and the integration style, wherein a rating of a first one of the plurality of integration components is greater than a rating of a second one of the plurality of integration components, and wherein the one or more of the plurality of integration components to implement the first message flow are determined based on the integration scores and the ratings.

22. A system comprising:

one or more processing units; and a memory storing program code executable by the one or more processing units to cause the system to:

determine an integration style of a first interface between two or more applications;

determine a first message flow of the first interface, the first message flow between two of the two or more applications and associated with an integration domain and the integration style;

determine a first one or more key characteristic values associated with the first message flow, the first one or more key characteristic values comprising one or more key characteristics values of each of a plurality of key characteristics;

determine a plurality of integration components associated with the integration domain and the integration style, each of the determined plurality of integration components associated with fulfillment data of each of a plurality of key characteristic values;

for each of the plurality of integration components, determine an integration score by:

for each of the plurality of key characteristics, determine a fulfillment score based on fulfillment data associated with the integration component for each of the one or more key characteristic values of the key characteristic; and determine the integration score based on the determined fulfillment scores; and determine one or more of the plurality of integration components to implement the first message flow based on the determined integration scores.

23. A system according to claim 22, wherein determination of a first one or more key characteristic values associated with the first message flow comprises:

determination of a questionnaire based on the integration style;

transmission of the questionnaire to a user;

in response to transmission of the questionnaire to the user, reception of the first one or more key characteristic values from the user.

24. A system according to claim 23, the program code executable by the one or more processing units to cause the system to:

determine a rating for each of the plurality of integration components based on the determined integration domain and the integration style, wherein a rating of a first one of the plurality of integration components is greater than a rating of a second one of the plurality of integration components, and wherein the one or more of the plurality of integration components to implement the first message flow are determined based on the integration scores and the ratings.

* * * * *